(12) United States Patent
Takeuchi (10) Patent No.: US 10,571,025 B2
(45) Date of Patent: Feb. 25, 2020

(54) AIRCRAFT FIRE SEAL STRUCTURE AND AIRCRAFT

(71) Applicant: MITSUBISHI AIRCRAFT CORPORATION, Aichi (JP)

(72) Inventor: Akira Takeuchi, Aichi (JP)

(73) Assignee: Mitsubishi Aircraft Corporation, Aichi (JP)

( * ) Notice: Subject to any disclaimer, the term of this patent is extended or adjusted under 35 U.S.C. 154(b) by 127 days.

(21) Appl. No.: 15/831,560

(22) Filed: Dec. 5, 2017

(65) Prior Publication Data

US 2018/0156334 A1 Jun. 7, 2018

(30) Foreign Application Priority Data

Dec. 5, 2016 (JP) ................................ 2016-235819

(51) Int. Cl.
| | |
|---|---|
| *F16J 15/06* | (2006.01) |
| *B64D 41/00* | (2006.01) |
| *F24F 13/02* | (2006.01) |
| *B64D 45/00* | (2006.01) |
| *B64C 1/14* | (2006.01) |
| *B64D 33/02* | (2006.01) |

(52) U.S. Cl.
CPC ........... *F16J 15/065* (2013.01); *B64C 1/1446* (2013.01); *B64D 41/00* (2013.01); *B64D 45/00* (2013.01); *F24F 13/0209* (2013.01); *B64D 2033/0213* (2013.01); *B64D 2045/009* (2013.01)

(58) Field of Classification Search
CPC ...... F16J 15/065; B64C 1/1446; B64D 41/00; B64D 45/00; B64D 2045/009; F02C 7/25; F24F 13/0209
See application file for complete search history.

(56) References Cited

U.S. PATENT DOCUMENTS

| | | | | |
|---|---|---|---|---|
| 1,626,237 | A * | 4/1927 | Hodgkinson | ........ F16J 15/4472 277/413 |
| 5,524,846 | A * | 6/1996 | Shine | ..................... B64D 27/00 244/121 |
| 5,910,094 | A * | 6/1999 | Kraft | ..................... B64D 29/00 277/419 |
| 2013/0187337 | A1* | 7/2013 | Brown | .................. F16J 15/008 277/312 |
| 2014/0318149 | A1* | 10/2014 | Guillon | ................... F02K 1/805 60/796 |
| 2015/0048202 | A1 | 2/2015 | Takeuchi | |

(Continued)

FOREIGN PATENT DOCUMENTS

JP 2014-141202 A 8/2014

*Primary Examiner* — Eugene G Byrd
(74) *Attorney, Agent, or Firm* — Osha Liang LLP (57) ABSTRACT

A fire seal structure prevents flame from coming out of a fire-prevention region of an aircraft including a panel and a duct. The fire seal structure includes: a first member provided on the duct at a connection portion between the panel and the duct; and a second member that faces the first member around the opening and is provided on the panel. The panel defines the fire-prevention region. The duct communicates with an opening provided in the panel. The duct defines, together with the panel, the fire-prevention region. The first and the second members each contain refractory material, and the first and the second members form a labyrinth-shaped gap between the duct and the panel.

10 Claims, 8 Drawing Sheets

FRONT                                                    REAR

(56) References Cited

U.S. PATENT DOCUMENTS

| | | | |
|---|---|---|---|
| 2015/0260101 A1* | 9/2015 | Teia Dos Santos Medes Gomes | F01D 11/24 60/39.091 |
| 2015/0337993 A1* | 11/2015 | Velarde | F16L 5/02 277/606 |
| 2015/0360795 A1* | 12/2015 | Livingston | B64D 45/00 244/129.2 |
| 2015/0367947 A1* | 12/2015 | Audart-Noel | B64D 29/06 244/54 |
| 2018/0163631 A1* | 6/2018 | Takeuchi | B64C 1/40 |
| 2018/0283280 A1* | 10/2018 | Cassagne | B64D 29/00 |

* cited by examiner

FIG. 1

FRONT     REAR

AIRCRAFT FIRE SEAL STRUCTURE AND AIRCRAFT

BACKGROUND OF THE INVENTION

Field of the Invention

The present invention relates to a fire seal structure that prevents flame from coming out of a fire-prevention region of an aircraft.

Description of the Related Art

A fire-prevention region is designated around an ignition source from which flame may originate, such as an engine main body and an auxiliary power unit of an aircraft, and it is required to prevent the flame originating inside the fire-prevention region from coming out of the fire-prevention region.

For example, the fire-prevention region that confines the flame originating from the engine main body (engine core) is designated inside an engine nacelle.

When the fire originates from the engine main body, it is necessary to prevent the flame from coming through a gap between the engine nacelle and a pylon to blow off to outside. Accordingly, the gap between the engine nacelle and the pylon is sealed by an elastic seal (JP 2014-141202 A).

The elastic seal containing a rubber material such as silicone rubber is inferior in fire resistance to a metal material such as stainless steel. Therefore, the fire seal performance of the elastic seal to prevent passage of flame has a room for improvement. If a member that shields the elastic seal from flame is necessary in order to delay a time until the fire seal performance is lost due to deterioration of adhesion between the elastic seal and a partner member through exposure to flame and burning down of the elastic seal, the weight of the fire seal structure is increased.

Further, inspection and replacement of the elastic seal are necessary because the elastic seal is abraded by friction with a contact member.

SUMMARY OF THE INVENTION

One or more embodiments of the present invention provide a fire seal structure for an aircraft that makes it possible to improve fire seal performance without necessity of adding a flame-shielding member and to reduce burden of maintenance, and to provide an aircraft.

A fire seal structure according to one or more embodiments of the present invention prevents flame from coming out of a fire-prevent region of an aircraft. The fire seal structure includes: a first member provided on a duct at a connection portion between a panel and the duct, the panel defining the fire-prevention region, and the duct communicating with an opening provided in the panel and defining, together with the panel, the fire-prevention region; and a second member that faces the first member around the opening and is provided on the panel. The first member and the second member each containing a refractory material form a labyrinth-like gap between the duct and the panel.

In the fire seal structure of one or more embodiments of the present invention, the first member and the second member are disposed to surround the opening over an entire circumference, and the labyrinth-like gap is provided over the entire circumference of each of the first member and the second member.

In the fire seal structure of one or more embodiments of the present invention, the panel includes an access panel and a body panel. The access panel includes a first opening as the opening and includes the second member extending along a peripheral edge of the first opening, and the body panel includes a second opening corresponding to the access panel. In addition, the access panel is provided on a peripheral edge of the second opening to open or close the second opening.

In the fire seal structure of one or more embodiments of the present invention, a peripheral edge of the first opening is reinforced by the second member.

In the fire seal structure of one or more embodiments of the present invention, the panel configures a tail cone that houses an auxiliary power unit of the aircraft, and the duct is used to take in air through the opening by the auxiliary power unit.

In the fire seal structure of one or more embodiments of the present invention, the first member includes a first wall that protrudes from the duct toward the panel, the second member includes a second wall that protrudes from the panel toward the duct at a position different from a position of the first wall in a radial direction of the opening, and the first wall and the second wall form the labyrinth-like gap between the duct and the panel.

In the fire seal structure of one or more embodiments of the present invention, the first member is a channel-shaped member that includes paired flanges facing each other in the radial direction and a web coupling the paired flanges, and at least three walls that include the paired flanges each serving as the first wall and the second wall located between the first walls, form the labyrinth-like gap.

In the fire seal structure of one or more embodiments of the present invention, the second member is a channel-shaped member that includes paired flanges facing each other in the radial direction and a web coupling the paired flanges, and at least three walls that include the paired flanges each serving as the second wall and the first wall located between the second walls, form the labyrinth-like gap.

In the fire seal structure of one or more embodiments of the present invention, the first member and the second member are each a channel-shaped member that includes paired flanges facing each other in the radial direction and a web coupling the paired flanges, and the paired flanges of the first member each serving as the first wall and the paired flanges of the second member each serving as the second wall are alternately disposed.

In the fire seal structure of one or more embodiments of the present invention, the labyrinth-like gap is blocked, inside in the radial direction of the opening, by a blocking member provided on one of the first member and the second member.

An aircraft according to one or more embodiments of the present invention includes any of the above-described fire seal structures.

According to the fire seal structure of one or more embodiments of the present invention, the labyrinth-like gap formed by the first member and the second member is interposed at the connection portion between the duct and the panel both defining the fire-prevention region. This makes it possible to prevent flame inside the fire-prevention region from coming out of the fire-prevention region. Even if the flame enters the meandering labyrinth-like gap through an inlet of the labyrinth, spreading of the flame is inhibited by walls configuring the labyrinth-like gap, based on straight travel property of the flame.

In this case, according to one or more embodiments, the first member and the second member are each made of the refractory material, such as a metal, excellent in durability against the flame as compared with a rubber material, and the labyrinth-like gap is maintained between the first member and the second member for a predetermined time under a situation where the first member and the second member are exposed to the flame. As a result, it is possible to prevent the flame originating in the fire-prevention region from coming out of the fire-prevention region for the predetermined time.

According to the fire seal structure of one or more embodiments of the present invention, the first member and the second member themselves withstand to the flame for the predetermined time, and the fire seal performance is sufficiently secured as long as the labyrinth-like gap is maintained. Accordingly, it is possible to improve the fire seal performance without adding a member that shields the first member and the second member from the flame. Since the member shielding the first member and the second member from the flame is unnecessary, it is also possible to contribute to reduction of a weight of the aircraft that is important in aircrafts.

According to one or more embodiments, a sealant material that seals a gap between members filled with the sealant material, has fire resistance approximate to that of the rubber material. Therefore, the single sealant material is difficult to be adapted to fire-resistance requirement as with the rubber seal, and addition of a flame-shielding member is accordingly necessary, which leads to weight increase. In other words, the labyrinth seal made of the refractory material of one or more embodiments of the present invention has fire resistance superior to that by filling of the sealant, in addition to the rubber seal.

Furthermore, in the fire seal structure of one or more embodiments of the present invention, the first member and the second member form the labyrinth-like gap and are not in contact with each other. Therefore, unlike a case where the elastic seal is used, deterioration of the fire seal performance caused by abrasion does not occur and a life time of the fire seal structure is long. This makes it possible to reduce burden of maintenance for the fire seal.

In one or more embodiments, when the metal elastic seal is used, structure reinforcement, etc. is necessary in order to sufficiently elastically deform the elastic seal that is made of the metal material having elasticity larger than that of the rubber material to stably obtain repulsive force necessary for sealing even under a situation where the elastic seal is exposed to the flame even though the metal elastic seal is saved from being burned down for a predetermined time. This leads to weight increase.

In one or more embodiments, in the case where the elastic seal is used in order to prevent passage of the flame, sufficient verification for a shape and repulsive force of the elastic seal in elastic deformation, the adhesion of the elastic seal with the contact surface, etc. is required on the assumption of the situation where the elastic seal is exposed to the flame.

In the fire seal structure according to one or more embodiments of the present invention, the labyrinth gap is formed by the first member and the second member in order to prevent passage of the flame without blocking the gap between the panel and the duct used to take in and exhaust air. A huge number of tests to verify that the gap between the duct and the panel is surely blocked is unnecessary as long as the labyrinth-like gap is formed by the refractory material specified in the aviation act.

DETAILED DESCRIPTION OF EMBODIMENTS

Embodiments of the present invention are described below with reference to the accompanying drawings.

In the embodiments described below, a fire seal structure that prevents flame from coming out of a fire-prevention region is described. The fire-prevention region is defined on the assumption of auxiliary power unit (APU) as an ignition source.

An auxiliary power unit 3 (hereinafter, referred to as APU) is provided at a rear end portion of an aircraft 1 illustrated in FIG. 1 according to one or more embodiments of the invention.

A tail cone 4 that is continuous to a rear end of a fuselage of the aircraft 1 is gradually decreased in diameter toward a terminal end at which an exhaust port 3A of the APU 3 is located. The tail cone 4 houses a main body 3B of the APU 3, an exhaust nozzle 3C, an intake duct 30, and accessories, meters, piping, etc. of the APU 3. An inside of the tail cone 4 and an inside of the fuselage provided forward thereof are partitioned by a bulkhead 4A. Further, the inside of the tail cone 4 is partitioned into a front portion and a rear portion by a wall 4B.

A fire-prevention region 5 is defined around the APU 3 for a case where fire originates from the APU 3, and it is required to prevent flame from coming out of the fire-prevention region 5.

Figure 1:
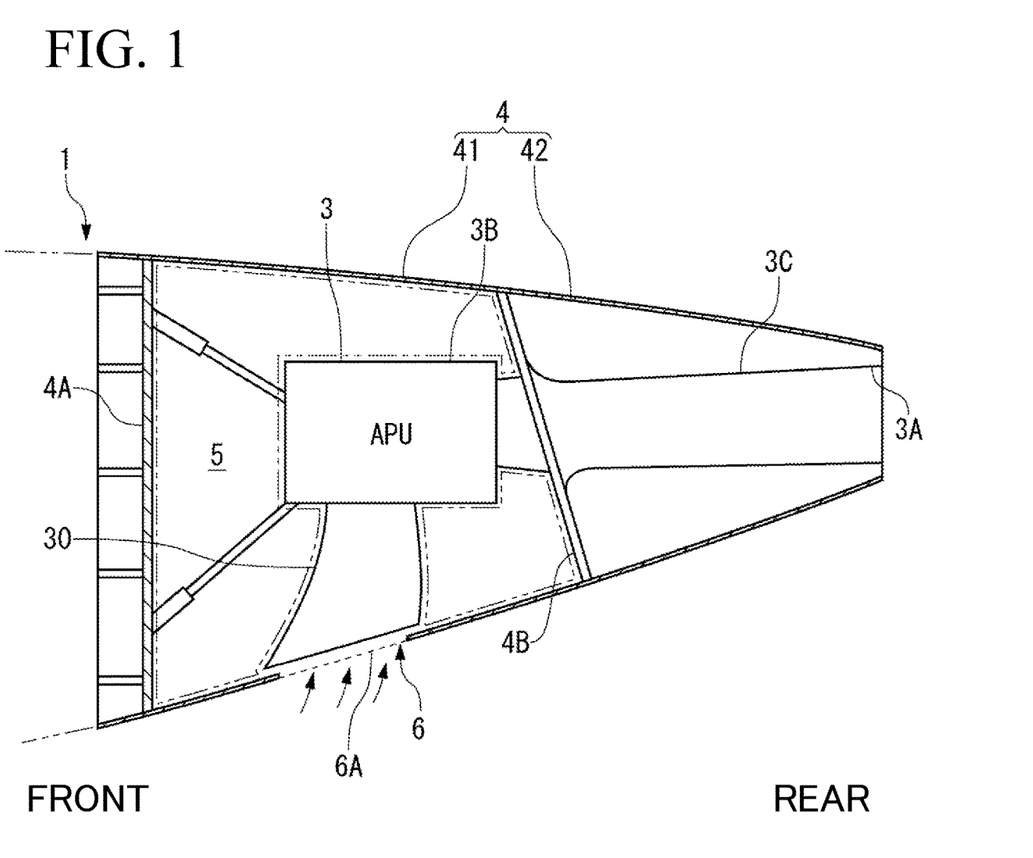
FIG. 1 is a schematic diagram illustrating an internal structure of a tail cone and a fire-prevention region of an aircraft according to one or more embodiments.

As illustrated by an alternate long and two short dashes line in FIG. 1, the fire-prevention region 5 corresponds to a space around the APU main body 3B and the intake duct 30, between the bulkhead 4A and the wall 4B.

In one or more embodiments, the tail cone 4 is divided into a body cone 41 and a nozzle cone 42, and the fire-prevention region 5 is surrounded by the body cone 41. The body cone 41 surrounds the APU main body 3B, and the nozzle cone 42 surrounds the exhaust nozzle 3C.

The body cone 41 is formed with use of an appropriate material such as a metal material and a fiber-reinforced plastic.

The tail cone 4 may not be divided into the cones 41 and 42 and may be integrally formed.

Figure 2:
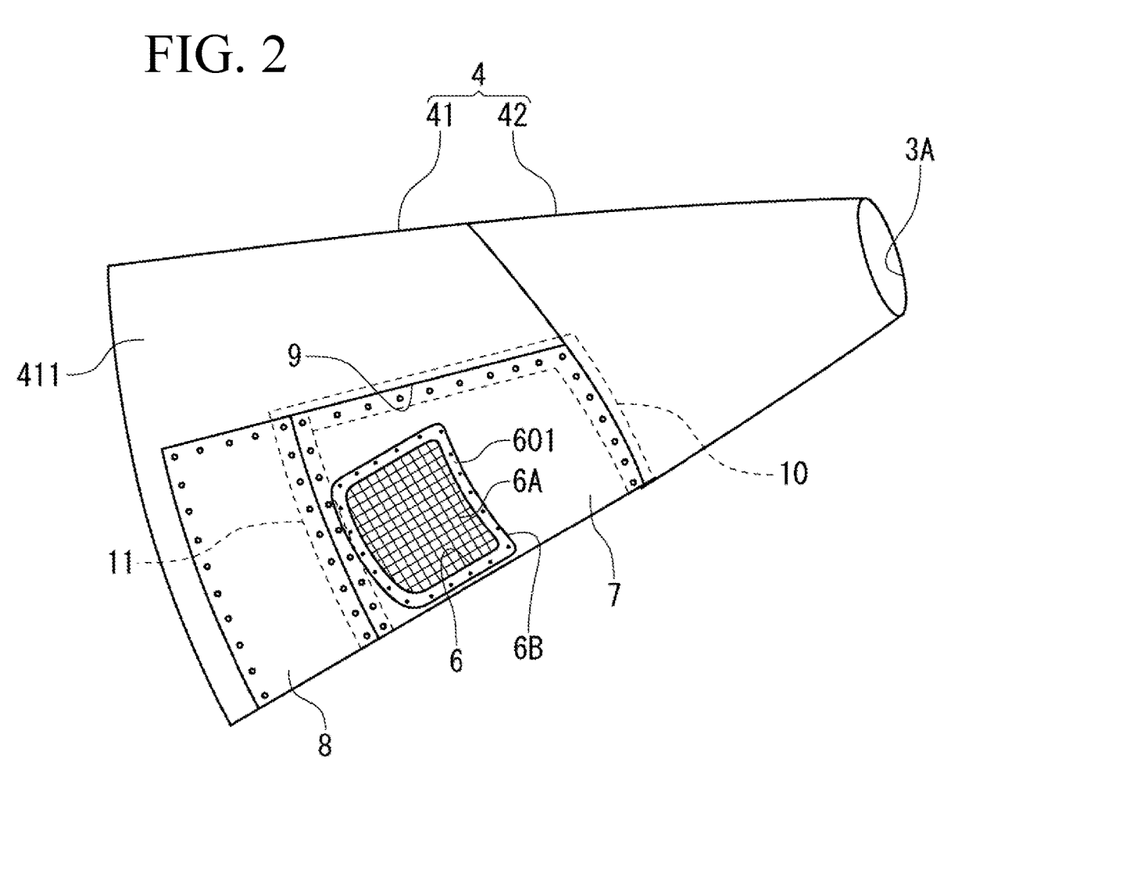
FIG. 2 is a perspective view illustrating the tail cone illustrated in FIG. 1 as viewed from a lower side.

As illustrated in FIG. 2, an intake port 6 (first opening) through which outside air is taken into the APU 3 is provided, at a lower part of the body cone 41, so as to penetrate through the body cone 41 in a thickness direction. The intake duct 30 (FIG. 3) that communicates with the intake port 6 is disposed inside the body cone 41.

Note that the intake port 6 may be provided at a portion other than the lower part of the body cone 41, for example, on one of right and left side walls in some cases, and the intake duct 30 is disposed sideways in such a case.

The intake port 6 of one or more embodiments has a substantially rectangular shape; however, the shape of the intake port 6 is not limited thereto, and may be a circular shape or an elliptical shape.

A mesh 6A that prevents an outside foreign matter and the like from entering the intake port 6 is attached to the body cone 41. A member to which the mesh to prevent a foreign matter from entering is attached is not limited to the body cone 41, and a similar mesh may be attached to, for example, the intake duct 30.

In the following, a direction that connects a center of the intake port 6 and a peripheral edge 601 of the intake port 6 is referred to as a radial direction D1.

Figure 4:
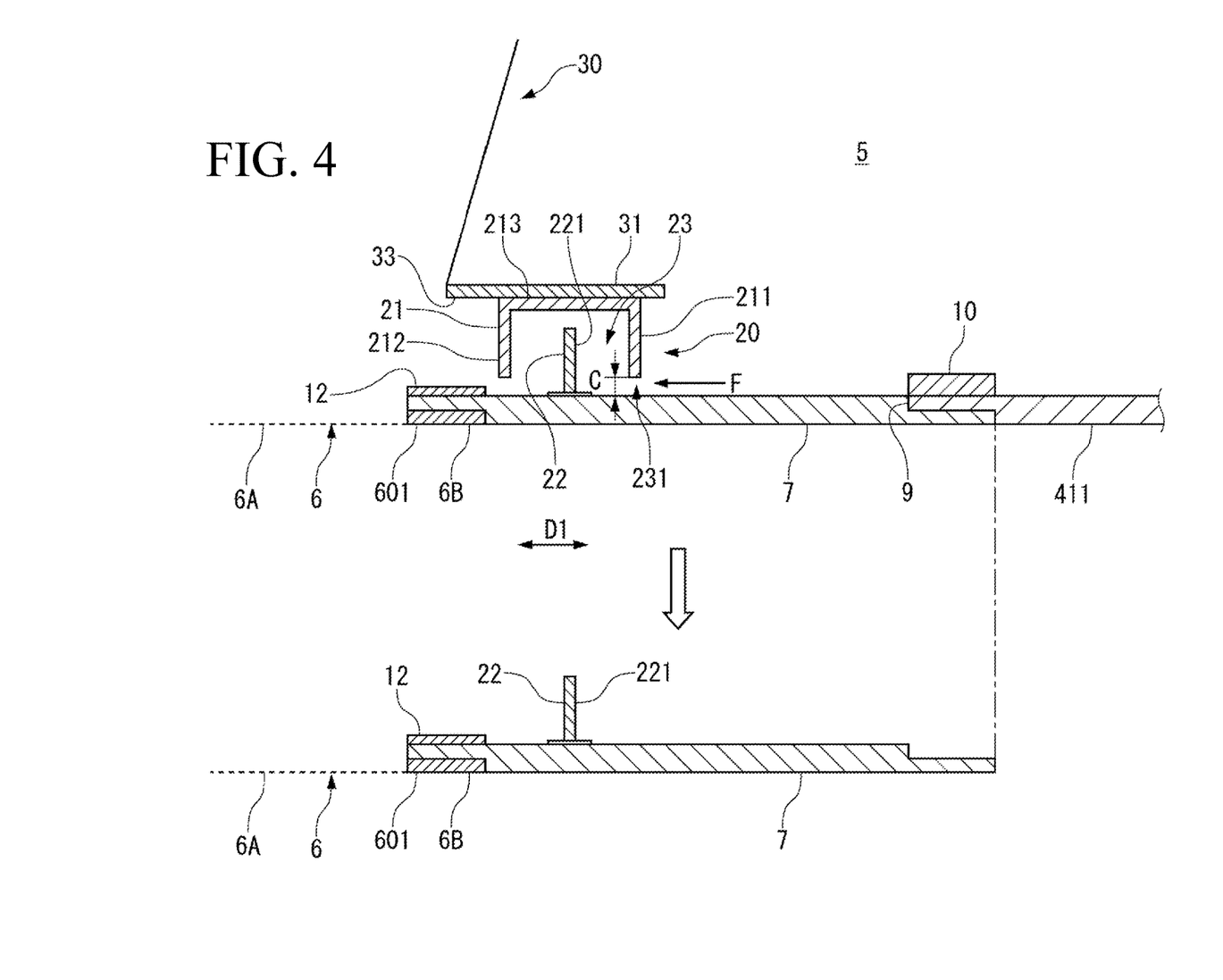
FIG. 4 is a cross-sectional view schematically illustrating a connection portion between the intake duct and the access panel, where an alternate long and short dash line indicates an example of a fastened position according to one or more embodiments.

For maintenance of the inside of the tail cone 4, a predetermined region including the intake port 6 and its surroundings in the body cone 41 is configured as a detachable access panel 7 (FIG. 2 and FIG. 4).

In one or more embodiments, a region located forward of the access panel 7 is also configured as a detachable access panel 8. The access panels 7 and 8 are each curved following the shape of the tail cone 4.

A body panel 411 of the body cone 41 includes a panel opening 9 (second opening) corresponding to the access panel 7. When the access panel 7 is detached, the panel opening 9 is released between a rear end of the access panel 8 and a front end of the nozzle cone 42.

The access panel 7 is provided on a peripheral edge of the panel opening 9 so as to open or close the panel opening 9.

As illustrated in FIG. 2 and FIG. 4, the peripheral edge of the panel opening 9 is reinforced by reinforcing members 10 and 11. The reinforcing member 10 (FIG. 2 and FIG. 4) is fastened to the body panel 411. The reinforcing member 11 (FIG. 2) is fastened to the access panels 7 and 8 across the access panels 7 and 8.

Figure 3:
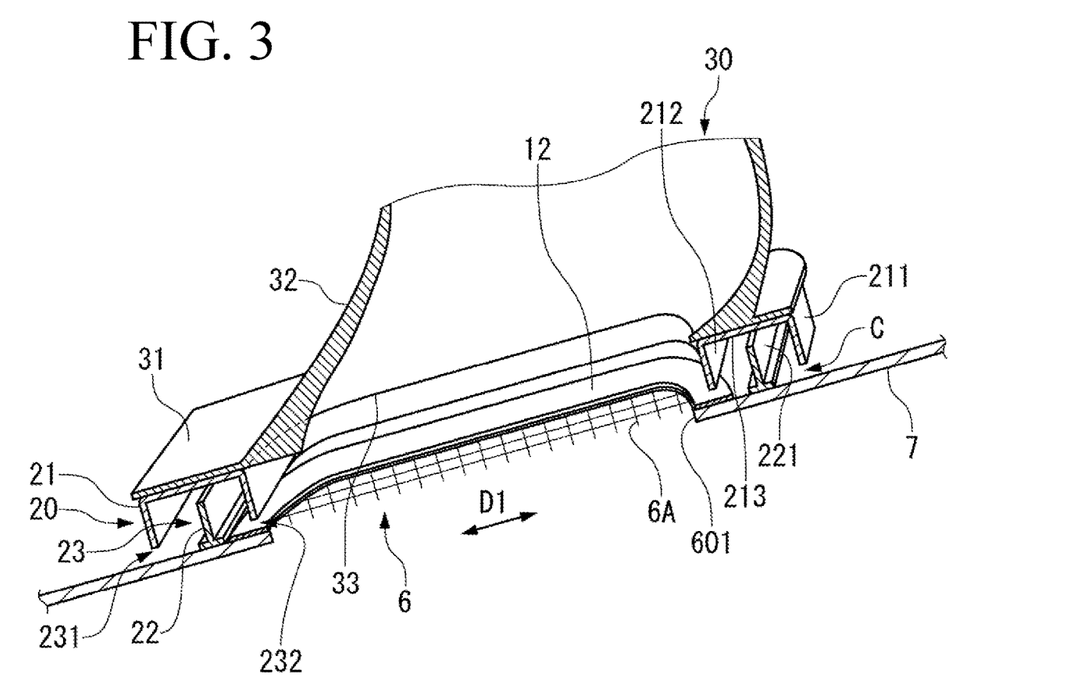
FIG. 3 is a perspective view illustrating an opening of an access panel, an intake duct of an APU that takes in air through the opening, and a fire seal structure according to one or more embodiments.

As illustrated in FIG. 3 and FIG. 4, a reinforcing frame plate 12 is disposed along the peripheral edge 601 of the intake port 6 provided in the access panel 7. When the reinforcing frame plate 12 and a frame 6B surrounding the mesh 6A are fastened to the access panel 7 by a rivet or a fastener, the peripheral edge 601 of the intake port 6 is reinforced and the mesh 6A is attached to the access panel 7.

A region opened or closed by the access panels 7 and 8 may be appropriately set in consideration of a space necessary for maintenance of the inside of the tail cone 4, positions of accessories inside the tail cone 4, etc. The access panel 7 and the access panel 8 may be integrally configured.

To prevent flame from coming out of the fire prevention region 5 at a connection portion between the intake duct 30 and the access panel 7, a fire seal structure 20 is provided in the body cone 41. The intake duct 30 and the access panel 7 define the fire-prevention region 5.

"Fire seal" indicates prevention of flame originating inside the fire-prevention region 5 from coming out of the fire-prevention region 5.

As illustrated in FIG. 3, the fire seal structure 20 is interposed between a flange 31 and the access panel 7. The flange 31 is provided at an end part (lower end part) of the intake duct 30 on the intake port 6 side.

A configuration of the intake duct 30 is first described.

The intake duct 30 includes a peripheral wall 32 and the flange 31, and is provided on APU main body 3B (FIG. 1). The peripheral wall 32 forms a passage through which outside air is taken into the main body 3B of the APU 3, and the flange 31 protrudes outward in the radial direction at a lower end of the peripheral wall 32. Illustration and description of the inside of the peripheral wall 32 are omitted.

A duct opening 33 surrounded by the lower end of the peripheral wall 32 is formed in a shape to have a shape similar to and the size of the intake port 6 penetrating through the access panel 7. To smoothly take the outside air, the peripheral wall 32 is inclined such that an upper end is located rearward of the lower end.

The flange 31 extends along the access panel 7 with a predetermined distance from a rear surface of the access panel 7.

The fire seal structure 20 includes a first member 21 (first member) provided on the intake duct 30, and a second member 22 (second member) provided on the access panel 7.

The first member 21 and the second member 22 are both made of a refractory material, and form a labyrinth gap 23 that is a labyrinth-like gap between the intake duct 30 and the access panel 7.

The "refractory material" indicates a material that has fire resistance sufficient to be saved from being excessively deformed, burned down, and lost even if the material is continuously exposed to flame for a predetermined fire resistance time required based on regulations, etc.

The first member 21 and the second member 22 may be made of, for example, the refractory material such as corrosion-resistant steel (stainless steel, CRES), an aluminum alloy, a titanium alloy, fiber-reinforced plastics containing glass fibers or carbon fibers as reinforcing fibers, an inorganic sintered body, a plasterboard, and a honeycomb sandwich panel, and materials matched to fire resistance test specified in the aviation act. The first member 21 and the second member 22 may be made of such a refractory material with a thickness sufficient to withstand flame for a necessary fire resistance time.

In addition to those exemplified above, the first member 21 and the second member 22 may be made of an appropriate refractory material having rigidity necessary for strength securement.

The fire seal structure 20 maintains the labyrinth gap 23 at least for the predetermined fire resistance time, thereby preventing the flame inside the fire-prevention region 5 from coming through between the first member 21 and the second member 22 to come out of the fire-prevention region 5.

As illustrated in FIG. 3 and FIG. 4, the first member 21 is disposed on a lower surface of the flange 31 of the intake duct 30. The second member 22 faces the first member 21 around the intake port 6.

The first member 21 and the second member 22 are located on outer periphery relative to the reinforcing frame plate 12. The first member 21 is fastened to the flange 31, and the second member 22 is fastened to the access panel 7.

Both of the first member 21 and the second member 22 are disposed along the peripheral edge 601 of the intake port 6 so as to surround the entire circumference of the intake port 6. The labyrinth gap 23 is provided over the entire circumference between the first member 21 and the second member 22.

The labyrinth gap 23 is specifically described with reference to FIG. 3 and FIG. 4.

The first member 21 is a channel-shaped member (having substantially C-shaped cross-section) that includes paired flanges 211 and 212 and a web 213 that couples the paired flanges 211 and 212. The paired flanges 211 and 212 face each other in the radial direction D1 of the intake port 6. The first member 21 is formed in an annular shape along the peripheral edge 601 of the intake port 6.

The flanges 211 and 212 protrude from the flange 31 of the intake duct 30 toward the access panel 7. These flanges 211 and 212 are referred to as "first walls" in the following.

The second member 22 includes a second wall 221 that protrudes from the access panel 7 toward the flange 31, thereby being formed to have a substantially I-shaped cross-section, and is formed in an annular shape along the peripheral edge 601 of the intake port 6.

The second wall 221 is located at a position different from the first walls 211 and 212 in the radial direction D1, more specifically, at a position between the first walls 211 and 212.

Note that, in place of the channel-shaped first member 21, two first members that are each formed to have a substantially I-shaped cross-section or an L-shaped cross-section may be used.

Each of the first walls 211 and 212 and the second wall 221 of one or more embodiments substantially perpendicularly stands on the flange 31 or on the access panel 7; however, each of the first walls 211 and 212 and the second wall 221 may stand so as to be inclined to the flange 31 and the access panel 7.

A clearance C is present between a front end of each of the first walls 211 and 212 and the access panel 7, and between a front end of the second wall 221 and the web 213 of the first member 21. In other words, the first member 21 and the second member 22 are not in contact with each other.

As illustrated in FIG. 4, when the access panel 7 is detached from the body panel 411, the second member 22 provided in the access panel 7 is separated from the first member 21 that remains in the intake duct 30.

Note that, in a case where the frame 6B of the mesh 6A is fastened to the access panel 7 by a detachable fastener, not the entire access panel 7 but the mesh 6A and the frame 6B corresponding to the intake port 6 may be detached to release the intake port 6. In this case, the second member 22 remains, together with the first member 21, on the access panel 7.

It is necessary to avoid interference between the first member 21 and the second member 22, based on relative displacement between the intake duct 30 and the access panel 7 due to external force such as an aerodynamic load and vibration, a trajectory of the second member 22 relative to the first member 21 in detachment of the access panel 7 from the body panel 411, etc. A dimension of the clearance C, an overlapping dimension of the first walls 211 and 212 and the second wall 221 in a vertical direction, a distance between adjacent walls out of the first wall 211, the second wall 221, and the first wall 212, etc. may be appropriately determined in order to prevent interference between the first member 21 and the second member 22 and to more surely prevent the flame from coming through.

Action of fire seal by the fire seal structure 20 is described with reference to FIG. 4.

Flame tries to pass through the gap between the flange 31 and the access panel 7 from the inside to the outside of the fire-prevention region 5. At this time, the first wall 211, the second wall 221, and the first wall 212 alternately protrude in a direction intersecting a direction in which the flame spreads substantially along the radial direction D1 between the flange 31 and the access panel 7. The labyrinth gap 23 that meanders with respect to the spreading direction of the flame is formed by the three walls 211, 221, and 212. Accordingly, even if flame F enters the meandering labyrinth gap 23 through an inlet of the labyrinth, namely, the gap between the access panel 7 and the front end of the first wall 211 located on the outside in the radial direction D1, the flame F does not turn because of straight travel property of the flame F. Therefore, spreading of the flame F is inhibited by the second wall 221 and the first wall 212.

In other words, the labyrinth gap 23 makes it possible to prevent the flame F from spreading from the inside to the outside of the fire-prevention region 5 through the gap between the flange 31 and the access panel 7.

The first member 21 and the second member 22 are both made of the refractory material, and maintain the labyrinth gap 23 between the first member 21 and the second member 22 for the necessary fire resistance time under the situation where the first member and the second member 22 are exposed to the flame. Accordingly, the fire seal structure 20 makes it possible to prevent the flame originating in the fire-prevention region 5 from coming out of the fire-prevention region 5 for the fire resistance time.

According to the fire seal structure 20, the first member 21 and the second member 22 themselves withstand to the flame for a long time as compared with the rubber elastic seal, and the fire seal performance is sufficiently secured as long as the labyrinth gap 23 is maintained. This makes it possible to improve the fire seal performance without adding a member that shields the first member 21 and the second member 22 from the flame. Further, it is possible to contribute to reduction of a weight of the aircraft.

At this time, when passage of flame is prevented by blocking the gap between the flange 31 and the access panel 7 with use of a metal elastic seal that is made of a metal material and has fire resistance equivalent to the fire resistance of each of the first member 21 and the second member 22, it is possible to delay a time until the elastic seal is melted and burned down through exposure to the flame, as compared with a case where the rubber elastic seal is used.

It is, however, difficult to apply sufficient pressure to the metal elastic seal that has elasticity higher than that of the rubber elastic seal, at the gap between the flange 31 and the access panel 7, and to stably obtain repulsive force necessary for sealing under the situation where the metal elastic seal is exposed to the flame, without structure reinforcement around the rubber seal that leads to weight increase.

In addition, in the case where the elastic seal is used in order to prevent passage of the flame, it is necessary to perform sufficient verification for a shape and repulsive force of the elastic seal in elastic deformation, the adhesion of the elastic seal with the surface of each of the flange 31 and the access panel 7, etc., on the assumption of the situation where the elastic seal is exposed to the flame.

The fire seal structure 20 makes it possible to significantly reduce burden of a huge number of tests to verify that the gap between the flange 31 and the access panel 7 is surely blocked, as compared with a case where passage of the flame is prevented by the elastic seal. It is sufficient to verify maintaining of the fire seal performance by a test in which the fire seal structure 20 is left under the situation where the fire seal structure 20 is exposed to the radiated flame for the predetermined fire resistance time, as long as the labyrinth gap 23 is formed of the refractory material specified in the aviation act. Accordingly, it is possible to supply the fire seal structure 20 with secured fire seal performance in a short development period.

Further, since the first member 21 and the second member 22 are not in contact with each other, deterioration of the fire seal performance due to abrasion does not occur in the fire seal structure 20 and the fire seal structure 20 has long lifetime, unlike the case where the elastic seal is used. Accordingly, it is possible to reduce burden of inspection, replacement, etc. necessary for securement of the fire seal performance. The fire seal structure 20 may make it possible to achieve maintenance free for a period corresponding to a life cycle of the aircraft.

In the fire seal structure 20, the labyrinth gap 23 is formed by the first member 21 and the second member 22 without blocking the gap between the flange 31 and the access panel 7, in order to prevent the flame from coming through the connection portion between the intake duct 30 and the access panel 7 to come out of the fire-prevention region 5. The first member 21 and the second member 22 are not in contact with each other and are separable from each other. Therefore, the access panel 7 including the second member 22 is detachable from the intake duct 30 including the first member 21. In other words, the fire seal structure 20 is matched to the detachable access panel 7.

Note that, in one or more embodiments, the access panel that is detachable from the body panel 411 over the entire circumference through removal of the fastener is exemplified; however, the fire seal structure 20 is applicable to an access panel (access door) that is configured to open or close the panel opening 9 by being rotated to the body panel 411 around a hinge part.

Modifications of the Embodiments

As illustrated in FIG. 4, the labyrinth gap 23 is formed by the first member 21 including two walls 211 and 212 and the second member 22 including one wall 221 in the above-described embodiments; however, the configuration is not limited thereto. The labyrinth gap 23 may be formed by a first member and a second member each having an appropriate form.

Figure 5A:
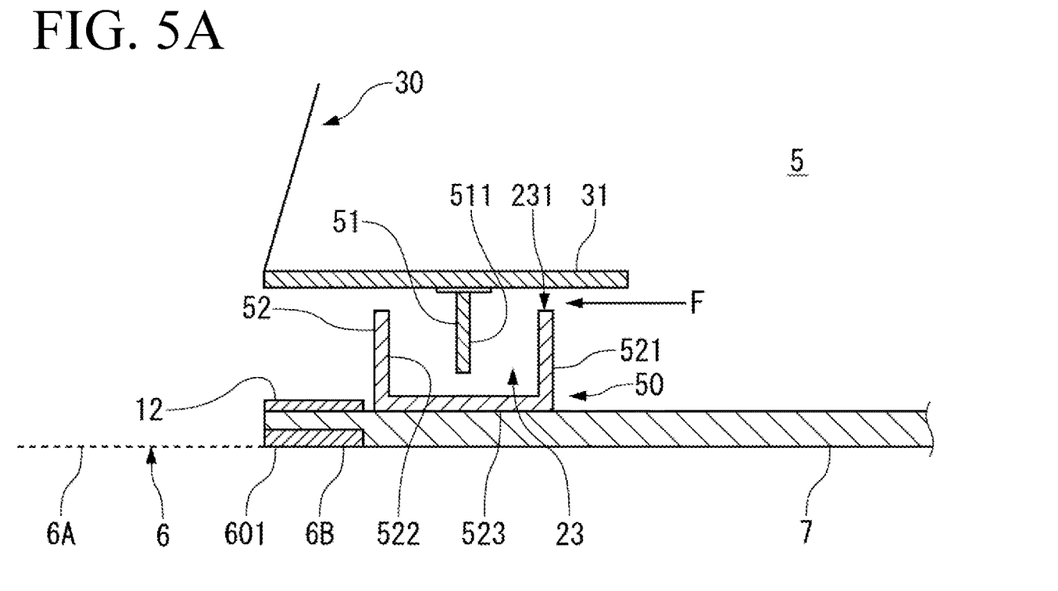
FIG. 5A and FIG. 5B are cross-sectional views each schematically illustrating a modification of one or more embodiments.

A fire seal structure 50 illustrated in FIG. 5A includes a first member 51 provided on the flange 31 of the intake duct 30, and a channel-shaped second member 52 (having substantially C-shaped cross-section) provided on the access panel 7.

The first member 51 is disposed on the flange 31 and the second member 52 is disposed on the access panel 7 such that a first wall 511 of the first member 51 is located between paired second walls 521 and 522 as flanges of the second member 52. As a result, the labyrinth gap 23 is formed between the first member 51 and the second member 52.

Even if the flame F enters an inlet 231 of the labyrinth gap 23 facing the fire-prevention region 5, it is possible to prevent spreading of the flame F by the first wall 511 and the second wall 522 that are located forward in the spreading direction of the flame F spreading straightly.

Figure 6A:
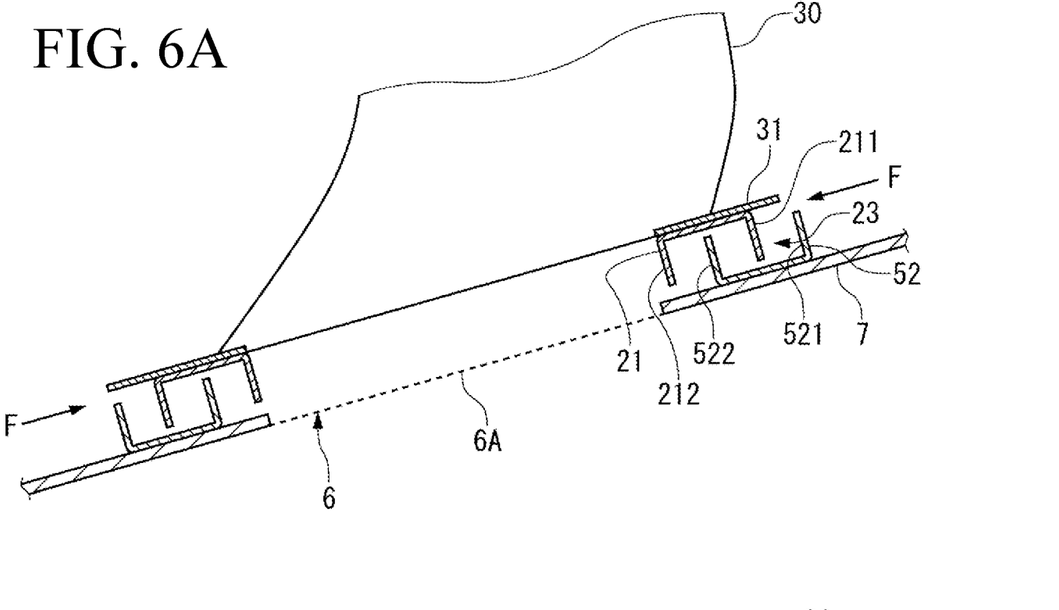
FIG. 6A and FIG. 6B are cross-sectional views each schematically illustrating a modification of one or more embodiments.

In an example illustrated in FIG. 6A, the first member 21 and the second member 52 each having a channel shape are used to form the labyrinth gap 23 between the first member 21 and the second member 52.

The paired first walls 211 and 212 of the first member 21 and paired second walls 521 and 522 of the second member 52 are alternately disposed. Note that the first member 21 and the second member 52 may be disposed such that the first wall 212 is located between the second walls 521 and 522.

According to the configuration illustrated in FIG. 6A, since the four walls 521, 211, 522, and 212 are provided between the flange 31 and the access panel 7, effect of suppressing passage of the radiated flame F is high.

Figure 6B:
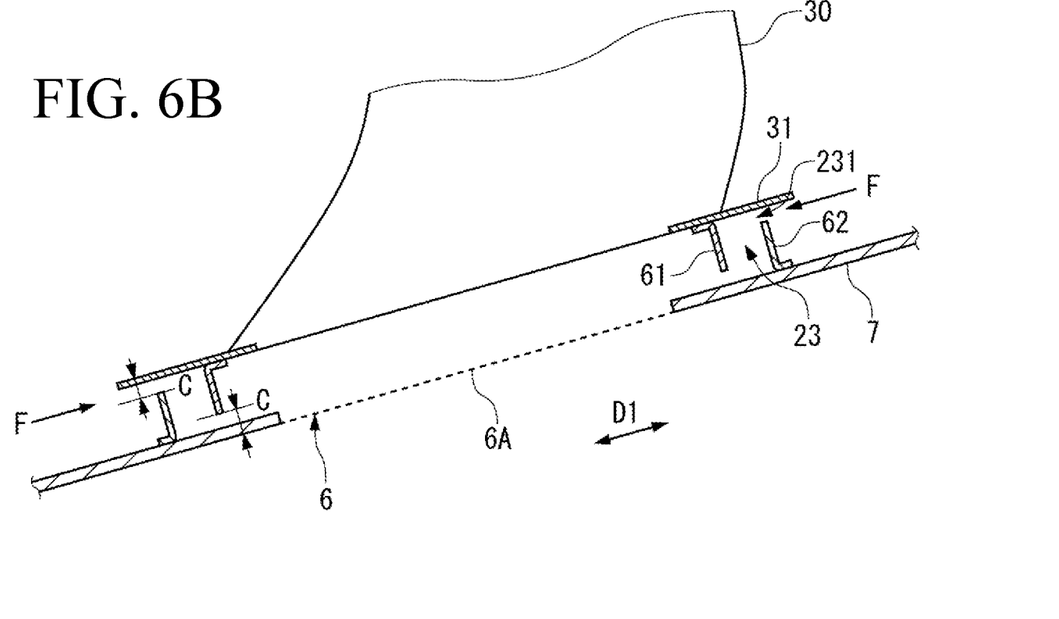

It is, however, sufficient for the fire seal structure of one or more embodiments of the present invention to include at least two walls, a wall 62 (second member) forming the inlet 231 of the labyrinth gap 23 and a wall 61 (first member) on which the flame F entering from the inlet 231 abuts, as illustrated in FIG. 6B. The wall 62 may be disposed inside of the wall 61 in the radial direction D1.

Appropriately setting the dimension of the gap C, an overlapping dimension of the wall 61 and the wall 62, a distance between the wall 61 and the wall 62 in the spreading direction of the flame, etc. makes it possible to sufficiently prevent passage of the flame F while reducing the number of walls to achieve weight reduction.

Figure 5B:
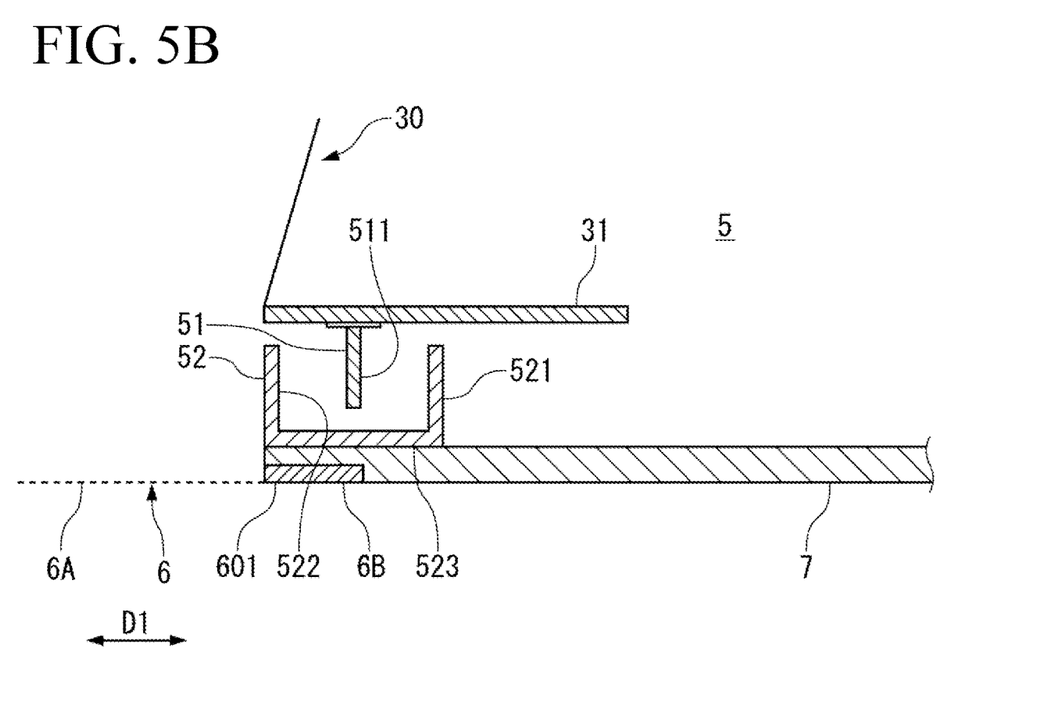

FIG. 5B illustrates a modification in which the second member 52 provided on the access panel 7 also serves as a reinforcing member to be located therearound, to contribute to reduction of the weight of the aircraft.

In the present modification, the peripheral edge 601 of the intake port 6 is reinforced by the second member 52. A web 523 of the second member 52 and the frame 6B of the mesh 6A are fastened to the access panel 7. As a result, the second member 52 reinforces the peripheral edge 601 of the intake port 6 and attaches the mesh 6A to the access panel 7. The web 523 is overlaid on and fastened to the access panel 7, which makes it possible to secure strength of the peripheral edge 601 equivalent to or more than that by the reinforcing frame plate 12.

In other words, the second member 52 also serves as the reinforcing frame plate 12 of FIG. 5A and the strength of the peripheral edge 601 of the intake port 6 is secured by the second member 52. This eliminates necessity of the reinforcing frame plate 12. Further, the second member 52 is disposed at the position of the reinforcing frame plate 12, which allows the second member 52 to be disposed on inner side in the radial direction D1 as compared with the configuration of FIG. 5A.

Accordingly, it is unnecessary to provide the reinforcing frame plate 12 and the member that fastens the reinforcing frame plate 12 to the access panel 7 and the frame 6B, and it is possible to form the second member 52 with a small diameter. This makes it possible to reduce the weight of the aircraft.

In place of the channel-shaped second member 52 (FIG. 5B), the peripheral edge 601 may be reinforced with use of a second member having an L-shaped cross-section or an I-shaped cross-section. The access panel 7 is supported from the rear side by such a second member, which reinforces the peripheral edge 601.

In the above-described embodiments and modifications, the first member (21, 51, or 61) is disposed on the intake duct 30 and the second member (22, 52, or 62) is disposed on the access panel 7. Alternatively, the first member may be integrally formed with the intake duct 30, and the second member may be integrally formed with the access panel 7, in order to reduce the weight.

In the fire seal structure of one or more embodiments of the present invention, the fact that the first member is "provided on" the intake duct 30 encompasses that the first member 21 or the like is integrally formed with the intake duct 30, in addition to the fact that the first member 21 or the like is disposed on the intake duct 30 by the fastening member.

Likewise, the fact that the second member is "provided on" the access panel 7 encompasses that the second member 22 or the like is integrally formed with the access panel 7, in addition to the fact that the second member 22 or the like is disposed on the access panel 7 by the fastening member.

Figure 7:
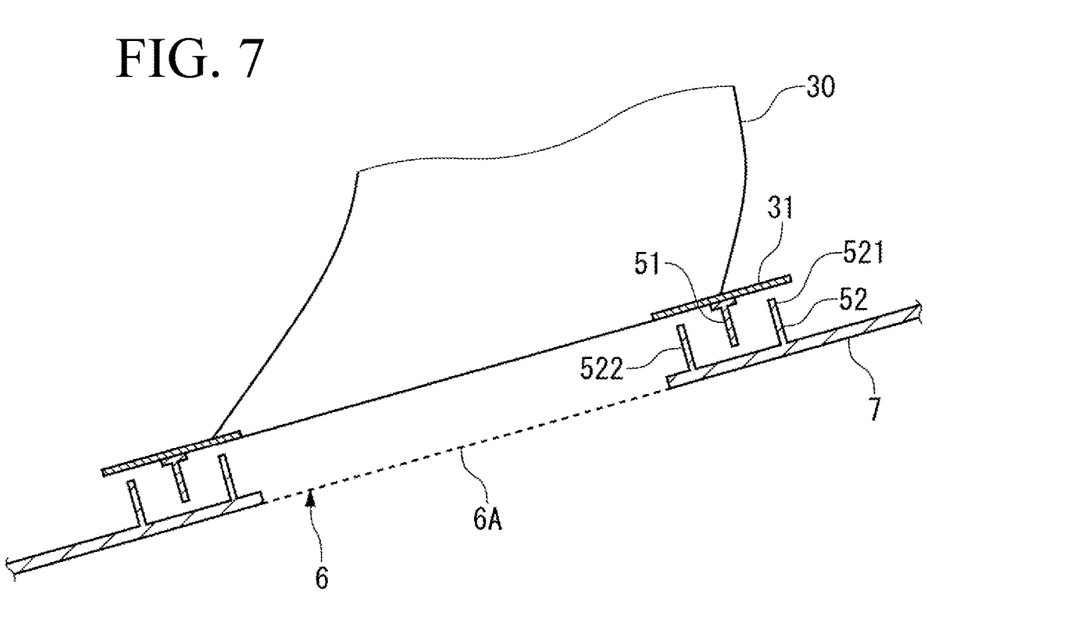
FIG. 7 is a cross-sectional view schematically illustrating another modification of one or more embodiments.

For example, when the second member 52 fastened to the rear surface of the access panel 7 as illustrated in FIG. 5A is integrally formed with the access panel 7, the second member 52 is integrally formed with the access panel 7 such that the access panel 7 includes the walls 521 and 522 each standing on the access panel 7 as illustrated in FIG. 7. The second member 52 is formable in formation of the access panel 7 with use of, for example, a fiber-reinforced plastic or a metal material. This makes it possible to reduce the weight because the web 523 (FIG. 5A) and the fastening member are unnecessary.

The second members (22, 52, and 62) that are illustrated in FIG. 4, FIG. 5B, FIG. 6A, and FIG. 6B are also integrally formable with the access panel 7.

In addition, the first members 21, 41, and 51 are also integrally formable with the flange 31 of the intake duct 30.

Next, additional embodiments of the present invention are described with reference to FIG. 8.

A fire seal structure 80 according to one or more embodiments includes a seal member 81 that blocks the labyrinth gap 23 inside the intake port 6 in the radial direction D1.

Figure 8:
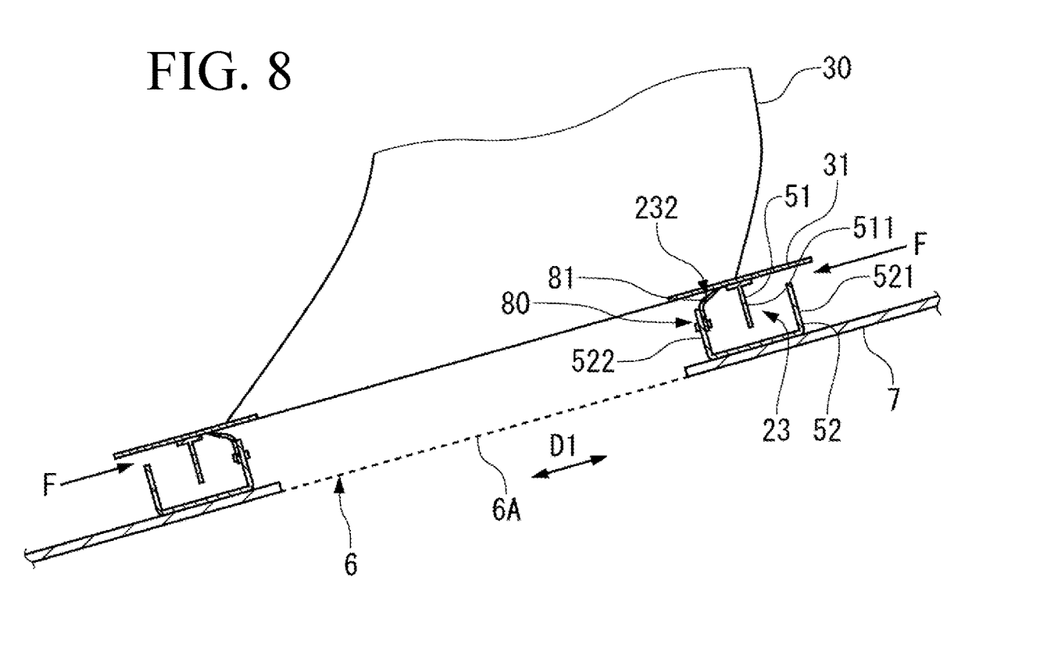
FIG. 8 is a cross-sectional view schematically illustrating a fire seal structure including a seal member that seals an end part of a labyrinth-like gap inside an intake port in a radial direction according to one or more embodiments.

As illustrated in FIG. 8, the rubber seal member 81 is fastened to the second wall 522 located inside in the radial direction D1, out of the second walls 521 and 522 of the second member 52. The seal member 81 blocks the gap between the front end of the second wall 522 and the flange 31 (outlet 232 of labyrinth gap 23). The seal member 81 blocks the outlet 232 of the labyrinth gap 23 over the entire circumference of the first member 51 and the second member 52.

As the seal member 81, an appropriate member that is compressed and is elastically deformed between members forming the outlet 232 of the labyrinth gap 23, such as a plate spring seal illustrated in FIG. 8 and a hollow valve seal, may be used.

Since the outlet 232 of the labyrinth gap 23 is blocked by the seal member 81, it is possible to prevent the outside air from entering the labyrinth gap 23 or to prevent the air (including flammable gas) inside the fire-prevention region 5 from coming out of the labyrinth gap 23, associated with intake of the outside air through the intake port 6. Accordingly, it is possible to take in a predetermined amount of outside air to the APU 3, based on pressure loss of the intake port 6 and the intake duct 30 that are appropriately determined with respect to a necessary intake flow rate.

The spreading of the flame F from the inside to the outside of the fire-prevention region 5 is prevented by the first wall 511 and the second wall 522 that form the labyrinth gap 23. Therefore, it is unnecessary for the seal member 81 to block the outlet 232 of the labyrinth gap 23 to prevent the flame from coming out of the fire-prevention region 5.

Since the seal member 81 is not directly exposed to the flame, it is unnecessary for the seal member 81 to have fire resistance equivalent to the fire resistance of each of the first member 51 and the second member 52. Deformation and melting of the seal member 81 due to heat of the flame are allowable in terms of fire-resistance requirement in the aviation act.

Accordingly, the seal member 81 may be formed with use of a typical rubber material that is inexpensive as compared with silicone rubber having relatively high fire resistance among the rubber materials.

It is sufficient for the seal member 81 to block the labyrinth gap 23 inside in the radial direction D1 and to suppress inflow and outflow of the air through the labyrinth gap 23. Therefore, it is unnecessary for the seal member 81 to have a thickness withstanding to the flame. The seal member 81 that has a thickness and a width sufficient to block the gap between the front end of the second wall 522 and the flange 31 is used in order to reduce the weight of the aircraft.

In place of the seal member 81, a member that applies large resistance to inflow and outflow of the air through the labyrinth gap 23, such as a brush, may be used. A brush-like member that is interposed between the second wall 522 and the flange 31 and applies resistance to air flow is also included in the blocking member of one or more embodiments of the present invention that blocks the outlet 232 of the labyrinth gap 23.

The seal member 81 may be provided on one of the first member 51 and the second member 52. The seal member 81 is applicable to any of the configurations in the aforementioned embodiments (FIG. 4) and the modifications (FIG. 5A, FIG. 6A, FIG. 6B, and FIG. 7).

Even if the duct 30 is an exhaust duct, blocking the outlet 232 of the labyrinth gap 23 by the seal member 81 is effective in order to achieve a predetermined exhaust amount.

Other than the above, the configurations described in the above-described embodiments may be selected, omitted, or appropriately modified without departing from the scope of the present invention.

A position of the APU 3 is not limited to the rear end portion of the aircraft. For example, the fire seal structure of one or more embodiments of the present invention is applicable to a fire-prevention region around an APU that is disposed near a base end portion of a main wing.

Moreover, the fire seal structure of one or more embodiments of the present invention is applicable to other fire-prevention regions of the aircraft without limitation to the fire-prevention region 5 set around the APU 3.

For example, the fire seal structure of one or more embodiments of the present invention is applicable to a connection portion between an engine nacelle (panel) and an optional duct (such as intake duct and exhaust duct) that communicates with an opening provided in the engine nacelle. The engine nacelle defines an unillustrated fire-prevention region set around a body of a main engine of the aircraft. The "engine nacelle" includes a device configured as a thrust reverser. In a case of a turbo engine, the duct may be placed on an inner circumferential side of a flow path of air that is sucked by a fan and is ejected rearward, and the opening communicating with the duct may face the flow path.

The configuration of any of the above-described modifications (FIG. 5 to FIG. 8) is applicable to the fire seal structure used in the fire-prevention region around the engine body.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS

1 Aircraft
3 Auxiliary power unit (APU)
3A Exhaust port
3B APU main body
3C Exhaust nozzle
4 Tail cone
4A Bulkhead
4B Wall
5 Fire-prevention region
6 Intake port 6 (opening, first opening)
6A Mesh
6B Frame
7 Access panel
8 Access panel
9 Panel opening (second opening)
10, 11 Reinforcing member
12 Reinforcing frame plate
20 Fire seal structure
21 First member
22 Second member
23 Labyrinth gap
30 Intake duct
31 Flange
32 Peripheral wall
33 Duct opening
41 Body cone
42 Nozzle cone
50 Fire seal structure
51 First member
52 Second member
61 Wall (first member)
62 Wall (second member)
80 Fire seal structure
81 Seal member (blocking member)
211, 212 First wall
213 Web
221 Second wall
231 Inlet
232 Outlet
411 Body panel
511 First wall
521, 522 Second wall
523 Web
601 Peripheral edge
C Clearance
D1 Radial direction
F Flame

What is claimed is:

1. A fire seal structure that prevents flame from coming out of a fire-prevention region of an aircraft including a panel and a duct, the fire seal structure comprising:
   a first member provided on the duct at a connection portion between the panel and the duct; and
   a second member that is disposed on the panel and faces the first member around an opening in the panel,
   wherein the panel defines the fire-prevention region,
   wherein the duct communicates with the opening,
   wherein the duct defines, together with the panel, the fire-prevention region,
   wherein the first and the second members each contain refractory material,
   wherein the first and the second members form a labyrinth-shaped gap between the duct and the panel, and
   the labyrinth-shaped gap is blocked, inside in a radial direction of the opening, by a blocking member disposed on one of the first and the second members.

2. The fire seal structure for the aircraft according to claim 1,
   wherein the first and the second members are disposed to surround the opening over an entire circumference of the opening, and
   wherein the labyrinth-shaped gap is provided over an entire circumference of each of the first and the second members.

3. The fire seal structure for the aircraft according to claim 1,
   wherein the panel includes an access panel and a body panel,
   wherein the access panel includes a first opening as the opening and includes the second member extending along a peripheral edge of the first opening, and
   wherein the body panel includes a second opening corresponding to the access panel, and
   wherein the access panel is provided on a peripheral edge of the second opening to open or close the second opening.

4. The fire seal structure for the aircraft according to claim 1, wherein a peripheral edge of the opening is reinforced by the second member.

5. The fire seal structure for the aircraft according to claim 1,
   wherein the panel is a tail cone that houses an auxiliary power unit of the aircraft, and
   wherein the duct is used to take in air through the opening by the auxiliary power unit.

6. The fire seal structure for the aircraft according to claim 1,
   wherein the first member includes a first wall that protrudes from the duct toward the panel,
   wherein the second member includes a second wall that protrudes from the panel toward the duct at a position different from a position of the first wall in a radial direction of the opening, and
   wherein the first wall and the second wall form the labyrinth-shaped gap between the duct and the panel.

7. The fire seal structure for the aircraft according to claim 6,
   wherein the first member is a channel-shaped member that includes paired flanges facing each other in the radial direction and a web coupling the paired flanges,
   wherein at least three walls form the labyrinth-shaped gap,
   wherein two of the at least three walls are the paired flanges each serving as the first wall, and another of the at least three walls is the second wall located between the paired flanges.

8. The fire seal structure for the aircraft according to claim 6,
   wherein the second member is a channel-shaped member that includes paired flanges facing each other in the radial direction and a web coupling the paired flanges, and
   wherein at least three walls form the labyrinth-shaped gap
   wherein two of the at least three walls are the paired flanges each serving as the second wall, and another of the at least three walls is the first wall located between the paired flanges.

9. The fire seal structure for the aircraft according to claim 6, wherein the first and the second members are each a channel-shaped member that includes paired flanges facing each other in the radial direction and a web coupling the paired flanges, and wherein the paired flanges of the first member each serving as the first wall and the paired flanges of the second member each serving as the second wall are alternately disposed.

10. An aircraft comprising the fire seal structure according to claim 1.

* * * * *